United States Patent
Wang et al.

(10) Patent No.: US 9,668,189 B2
(45) Date of Patent: May 30, 2017

(54) HANDOVER MANAGEMENT METHOD AND BASE STATION USING THE SAME

(71) Applicant: Industrial Technology Research Institute, Hsinchu (TW)

(72) Inventors: Chun-Chieh Wang, Kaohsiung (TW); Guan-Hsien Du, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 98 days.

(21) Appl. No.: 14/541,156

(22) Filed: Nov. 14, 2014

(65) Prior Publication Data

US 2016/0142959 A1    May 19, 2016

(51) Int. Cl.
*H04W 36/24* (2009.01)

(52) U.S. Cl.
CPC .................................. *H04W 36/245* (2013.01)

(58) Field of Classification Search
CPC .... H04W 16/28; H04W 36/00; H04W 36/245
See application file for complete search history.

(56) References Cited

U.S. PATENT DOCUMENTS

| | | |
|---|---|---|
| 7,283,092 B2 | 10/2007 | Feng et al. |
| 8,331,936 B2 | 12/2012 | Alonso-Rubio et al. |
| 2005/0272472 A1 * | 12/2005 | Goldberg ............. H04W 16/28 455/562.1 |
| 2009/0170514 A1 * | 7/2009 | Yokoyama ............ H04W 74/08 455/436 |
| 2013/0109389 A1 | 5/2013 | Olofsson et al. |
| 2013/0156009 A1 | 6/2013 | Dinan |
| 2013/0303231 A1 | 11/2013 | Yiu et al. |
| 2013/0310099 A1 | 11/2013 | van Rensburg et al. |

(Continued)

FOREIGN PATENT DOCUMENTS

| | | |
|---|---|---|
| CN | 103095355 | 5/2013 |
| TW | 201434328 | 9/2014 |

OTHER PUBLICATIONS

"Office Action of Taiwan Counterpart Application", issued on Jan. 21, 2016, p. 1-p. 5.

(Continued)

*Primary Examiner* — Dinh P Nguyen
(74) *Attorney, Agent, or Firm* — Jianq Chyun IP Office

(57) ABSTRACT

The present disclosure proposes a handover management method and a base station having a smart antenna using the same method. A transceiver of the base station transmits and receives wireless data. An interface controller of the base station transmits a source beam-forming information and receives a target beam-forming information. A processing circuit of the base station is coupled to the transceiver circuit and the interface controller and is configured for transmitting the source beam-forming information when switching to a setting of the smart antenna corresponding to the source beam-forming information and receiving the target beam-forming information using the interface controller, recording the source beam-forming information and the target beam-forming information as a beam-forming pair to a history of a handover when performing the handover, grouping the beam-forming pair in the history into beam-forming pair groups, and determining handover parameters for each of the beam-forming pair groups respectively.

18 Claims, 13 Drawing Sheets

(56) References Cited

U.S. PATENT DOCUMENTS

2014/0148173 A1* 5/2014 Karaoguz ............ H04B 7/0408
 455/440
2014/0274049 A1 9/2014 Singh et al.

OTHER PUBLICATIONS

Kai Yang, et al., "Coordinated Dual-Layer Beamforming for Public Safety Network: Architecture and Algorithms," 2012 IEEE International Conference on Communications (ICC), Jun. 10-15, 2012, pp. 4095-4099.
Zhenzhen Wei, "Mobility Robustness Optimization based on UE mobility for LTE system," 2010 International Conference on Wireless Communications and Signal Processing (WCSP), Oct. 21-23, 2010, pp. 1-5.
Kristina Zetterberg, et al., "On Heterogeneous Networks Mobility Robustness," 2013 IEEE 77th Vehicular Technology Conference (VTC Spring), Jun. 2-5, 2013, pp. 1-5.
Hoang Duc Tuong, et al., "Handover protocol based on estimated received signal strength for target beam in beam division cellular communication systems," 2013 IEEE 78th Vehicular Technology Conference (VTC Fall), Sep. 2-5, 2013, pp. 1-5.
Stephen S. Mwanje, et al., "Self-Organized Handover Parameter Configuration for LTE," 2012 International Symposium on Wireless Communication Systems (ISWCS), Aug. 28-31, 2012, pp. 26-30.
M. Cheng, et al., "Beamforming and positioning-assisted handover scheme for long-term evolution system in high-speed railway," IET Communications, vol. 6, Issue 15, Oct. 16, 2012, pp. 2335-2340.

* cited by examiner though listed in this text or figures, it would still be understood that both the foregoing

HANDOVER MANAGEMENT METHOD AND BASE STATION USING THE SAME

BACKGROUND

1. Field of the Disclosure

The present disclosure relates to a handover management method and a base station using the same method.

2. Description of Related Art

For wireless communication systems such as the long-term evolution (LTE) communication system, 802.16, Wideband Code Division Multiple Access (W-CDMA), and so forth, a base station (BS) would initiate a handover procedure when a user equipment (UE) has been detected to move out of a coverage area in order to ensure that the wireless service provided for the UE is not disrupted. FIG. 1 illustrates an example of a typical handover procedure of LTE. It is assumed that UE 105 is moving into the coverage area 104 of the BS 103 from the coverage area 102 of the BS 101. In step S106, when the UE 105 is in the coverage area 102 of the BS 101, the BS 101 would configure handover parameters and signal UE 105 to perform a signal measurement. In step S107, when the UE 105 has measured that the received signal strength from the BS 103 is larger than the signal strength received from the BS 101 (e.g., A3 event threshold has been exceeded) as the UE 105 is in the overlapping area between coverage area 104 of BS 103 and coverage area 102 of BS 101, the UE 105 would report a notification (e.g., the A3 event has been triggered) to the BS 101. In step S108, the BS 101 and the BS 103 would perform the handover procedure in response to receiving the notification. After the handover procedure has been performed in step S109, the UE 105 would connect to the BS 103.

On the other hand, the technology of the smart antenna is developing rapidly in the application of the wireless communication in the last few years. Because the technology of smart antenna would be able to detect current network environments as well as user behaviors and would also alter the directivity and radiation pattern of an antenna by using the technology of the beam-forming to elevate the resource efficiency of a spectrum and quality of signals, the technology of the smart antenna could be considered as one of the leading technologies for the next generation (or 5$^{th}$ generation) of communication standard. However, the technology of smart antenna has not been implemented in the current LTE communication systems as lots of mechanisms are designed based on omnidirectional antenna. One of the mechanisms for optimization of handover behavior is call as Mobility Robustness Optimization (MRO) which is proposed by Third Generation Partnership Project (3PP) and is an important function of Self Organization Network (SON) of a small-cell BS. MRO's basic concept is to perform progressive modifications by using history data of users' handover behaviors, so as to reduce situations of abnormal handovers (e.g., too-early handover or too-late handover).

Taking FIG. 1 as an example of a typical MRO procedure. The BS 101 would analyze records of the past handover/abnormal handover such as handover result, timestamp, etc. Next, the BS 101 may adjust handover parameters according the analyzed records. Subsequently, the BS 101 would notify the UE 105 the updated handover parameters so that the UE 105 could perform a handover based on updated handover parameters with higher probability of a successful handover. However, a traditional progressive modification of MRO is only utilized for an omnidirectional antenna with fixed transmission signals and thus would be difficult to be utilized for a smart antenna with varying transmission signals.

FIG. 2 is an example that illustrates a coverage area of two smart antennas with different beam patterns. When BS 201 with smart antenna switches the beam patterns, for example, beam pattern #9(206) to beam pattern #2(207), the distribution of transmission signals of whole wireless network may be thus switched for the BS 201. The previous recorded handover history data (e.g., handover from beam pattern #9(206) of the BS 201 to beam pattern #9(209) of the BS 202) and the previous configured system parameters may not suitable for the current network environment, and therefore system parameters would need to be re-configured again. Furthermore, if a BS with a smart antenna switches the beam patterns too often, the mechanism of MRO may be difficult to obtain optimal handover parameters. If the UEs or the BSs are configured with unsuitable handover parameters, situations such as abnormal handovers, handover failures, or service interruptions may occur. Consequently, the quality of system service would be decreased.

SUMMARY OF THE DISCLOSURE

Accordingly, the present discourse is directed to a handover management method and a base station using the same method.

In particular, the present disclosure proposes a handover management method used by a base station with a smart antenna, to perform including at least but not limited to transmitting a source beam-forming information when switching to a setting of the smart antenna corresponding to the source beam-forming information and receiving a target beam-forming information, recording the source beam-forming information and the target beam-forming information as a beam-forming pair to a history of a handover when performing the handover, grouping the beam-forming pair in the history into beam-forming pair groups, and determining handover parameters for each of the beam-forming pair groups respectively.

The present disclosure proposes a base station with a smart antenna, including at least but not limited to a transceiver circuit, an interface controller, and a processing circuit coupled to the transceiver circuit and the interface controller. The transceiver is configured for transmitting and receiving wireless data. The interface controller is configured for transmitting a source beam-forming information and receiving a target beam-forming information. The processing circuit is configured for transmitting the source beam-forming information when switching to a setting of the smart antenna corresponding to the source beam-forming information and receiving the target beam-forming information using the interface controller, recording the source beam-forming information and the target beam-forming information as a beam-forming pair to a history of a handover when performing the handover, grouping the beam-forming pair in the history into beam-forming pair groups, and determining handover parameters for each of the beam-forming pair groups respectively.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
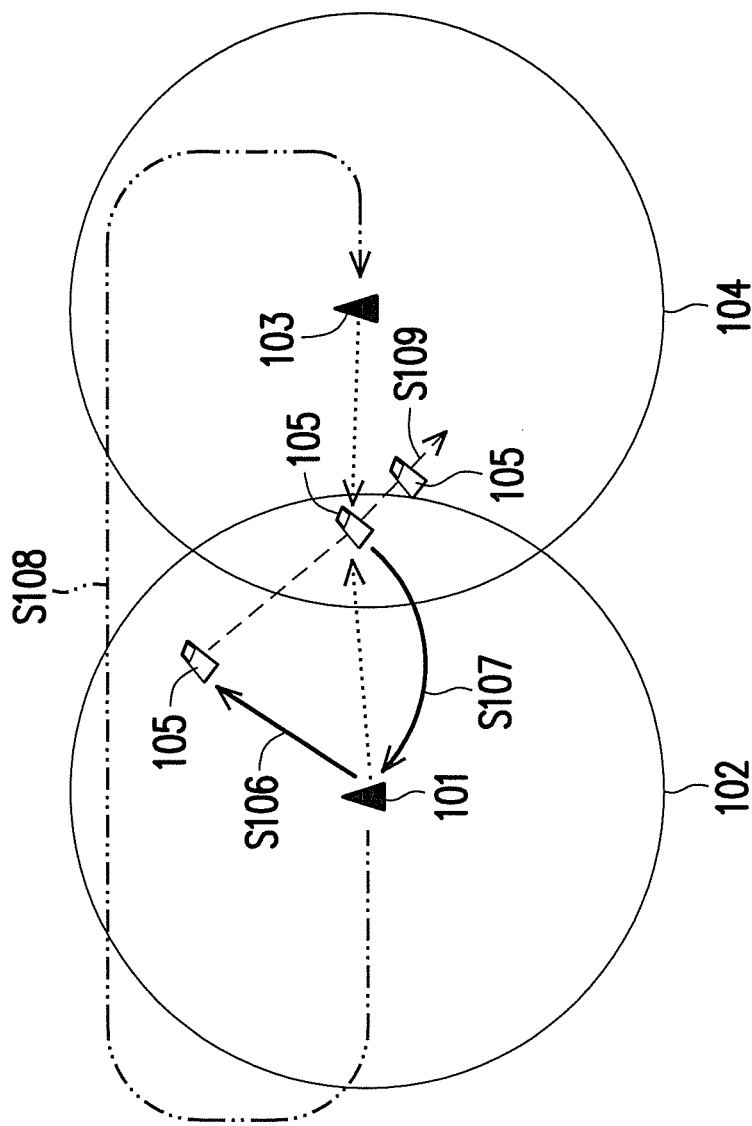
FIG. 1 illustrates an example of the handover procedure of LTE.

Reference will now be made in detail to the present preferred embodiments of the disclosure, examples of which are illustrated in the accompanying drawings. Wherever possible, the same reference numbers are used in the drawings and the description to refer to the same or like parts.

In this disclosure, 3GPP-like keywords or phrases are used merely as examples to present inventive concepts in accordance with the present disclosure; however, the same concept presented in the disclosure can be applied to any other systems such as IEEE 802.11, IEEE 802.16, WiMAX, and so like by persons of ordinarily skilled in the art.

The Mobility Robustness Optimization (MRO) is a handover mechanism that analyzes a history of handover behaviors and adjusts handover parameters based on the history of handover behaviors. A base station (BS) with a smart antenna may switch to a beam pattern that could be predetermined for a predetermined period (e.g., 10 minutes, 30 minutes, or an hour) or may switch to a beam pattern based on positions of UEs. Different beam patterns could be used based on different handover parameters. Therefore, a handover management method and a base station using the same are proposed to further optimize a smart antenna. The proposed handover management method would record a beam pattern pair used by two BSs as reference of handover data when two BSs are performing a handover from one BS to the other. After a predetermined amount of the handover behaviors records of the beam pattern pairs is reached, the BSs would analyze the handover behaviors of the UEs according to the handover behavior records of the beam pattern pairs, so as to determine the most suitable handover parameters for different beam pattern pairs.

The term "base station" (BS) in this disclosure could represent various embodiments which for example could include but not limited to a Home Evolved Node B (HeNB), an eNB, an advanced base station (ABS), a base transceiver system (BTS), an access point, a home base station, a relay station, a scatterer, a repeater, an intermediate node, an intermediary, and/or satellite-based communications base stations.

Figure 3A:
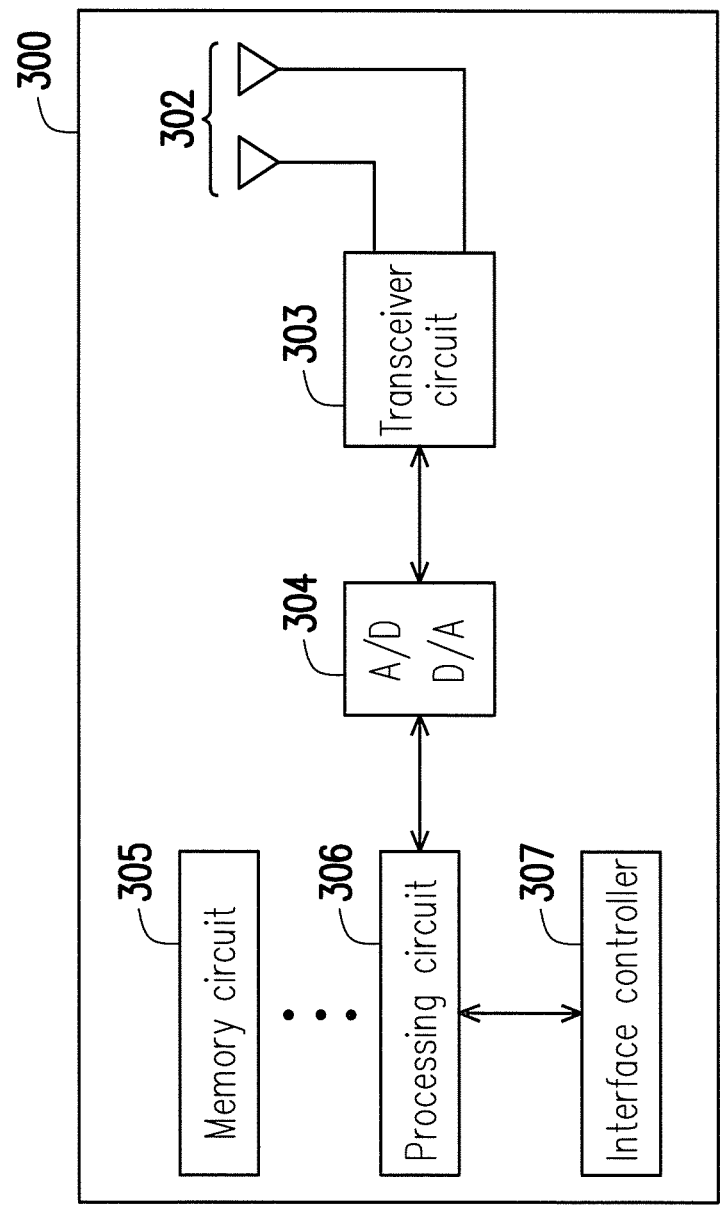
FIG. 3A is a block diagram illustrating a base station in accordance with an exemplary embodiment of the present disclosure.

A BS may be represented by at least the functional elements as illustrated in FIG. 3A in accordance with an embodiment of the present disclosure. The BS 300 may contain at least but not limited to a transceiver circuit 303, an analog-to-digital (A/D)/digital-to-analog (D/A) converter 304, a processing circuit 306, optionally a memory circuit 305, an interface controller 307, and one or more smart antenna units 302. The smart antenna units 302 could be configured with different beam patterns such as 9, 14, or 27 beam patterns and control the transmit power according to the selected beam pattern. The transceiver circuit 303 transmits downlink signals and receives uplink signals wirelessly. The transceiver circuit 303 may also perform operations such as low noise amplifying, impedance matching, frequency mixing, up or down frequency conversion, filtering, amplifying, and so like. The analog-to-digital (A/D)/digital-to-analog (D/A) converter 304 is configured to convert from an analog signal format to a digital signal format during uplink signal processing and from a digital signal format to an analog signal format during downlink signal processing. The interface controller 307 is configured to transmit and receive beam-forming information via an inter-base station or inter-eNB interface which may facilitate a wired or a wireless connection between two BSs. The inter-eNB interface could be the X2 interface used by the LTE. The beam-forming information may include beam pattern information, antenna array information, etc. In another embodiment, the beam-forming information may be transmitted and received by the transceiver circuit 303.

Figure 3B:
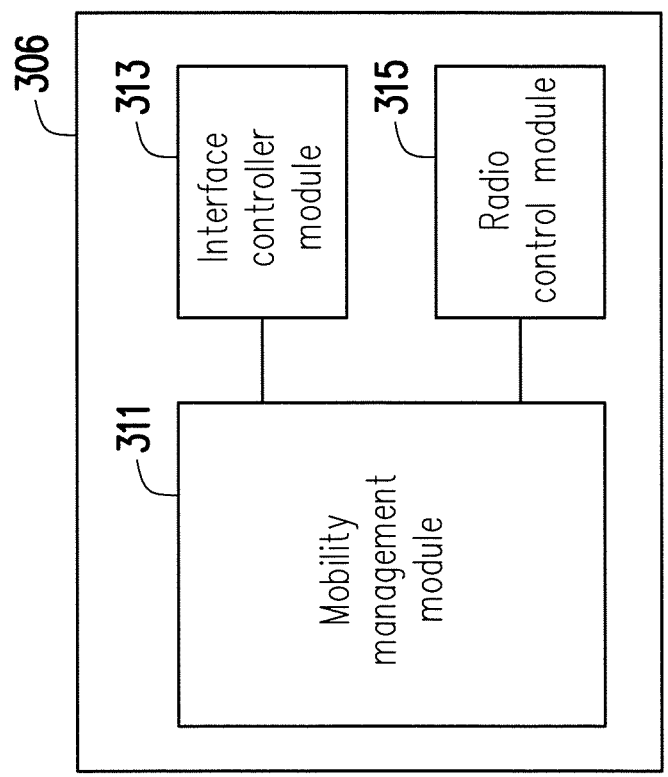
FIG. 3B is a block diagram illustrating the modules stored in the memory circuit 305 according to an exemplary embodiment of the present disclosure.

The processing circuit 306 is configured to process digital signal and to perform procedures of the proposed method for MRO mechanism in accordance with exemplary embodiments of the present disclosure. Also, the processing circuit 306 may optionally be coupled to a memory circuit 305 to store programming codes, device configurations, a codebook, buffered or permanent data, and records a plurality of modules that can be executed by the processing unit 306. FIG. 3B is a block diagram illustrating the modules according to an exemplary embodiment of the present disclosure. These modules include mobility management module 311, interface controller module 313 (for example, X2 interface controller module), and radio control module 315 (for example, layer 3 Radio Resource Control (RRC) connection control module), and those modules could either be independent from or integrated into the processing unit 16 to perform the handover management method of the disclosure. The functions of the processing circuit 306 may be implemented by using programmable units such as a microprocessor, a micro-controller, a DSP chips, FPGA, etc. The functions of the processing circuit 306 may also be implemented with separate electronic devices or ICs, and the processing circuit may also be implemented with either hardware or software.

The term "user equipment" (UE) in this disclosure could represent various embodiments which for example could include but not limited to a mobile station, an advanced mobile station (AMS), a server, a client, a desktop computer, a laptop computer, a network computer, a workstation, a personal digital assistant (PDA), a tablet personal computer (PC), a scanner, a telephone device, a pager, a camera, a television, a hand-held video game device, a musical device, a wireless sensor, and so like. In some applications, a UE may be a fixed computer device operating in a mobile environment, such as a bus, train, an airplane, a boat, a car, and so forth.

Figure 3C:
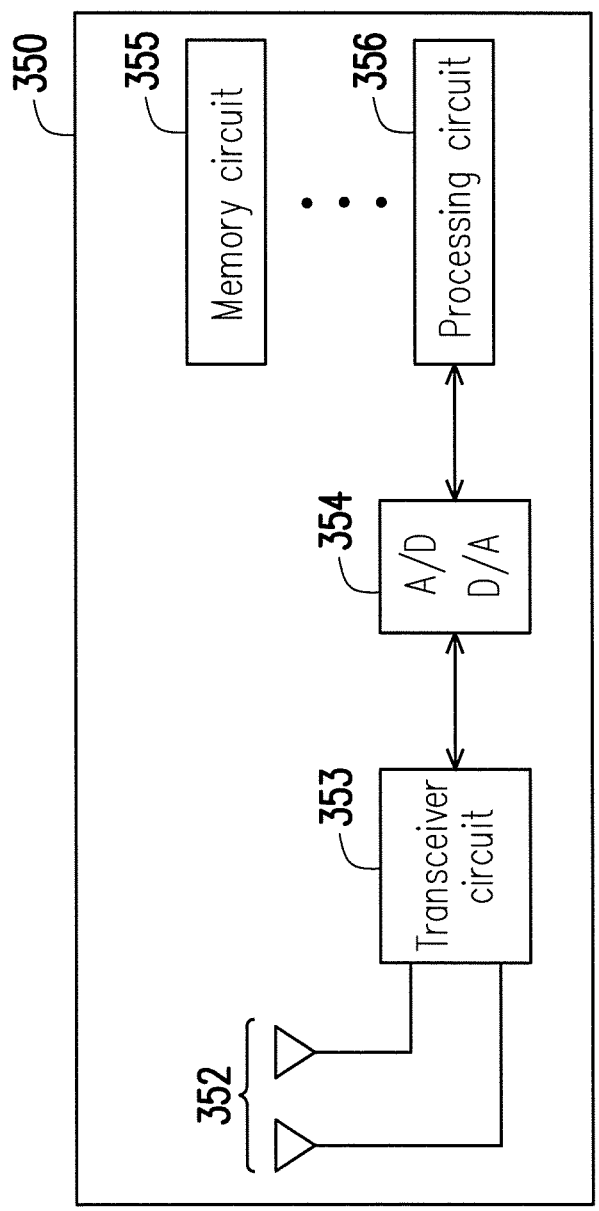
FIG. 3C is a block diagram illustrating a user equipment in accordance with an exemplary embodiment of the present disclosure.

A UE may be represented by at least the functional elements as illustrated in FIG. 3C in accordance with an embodiment of the present disclosure. The UE 350 may contain at least but not limited to a transceiver circuit 353, an analog-to-digital (A/D)/digital-to-analog (D/A) converter 354, a processing circuit 356, optionally a memory circuit 355, and one or more antenna units 352. The memory circuit 355 may store programming codes, device configurations, buffered or permanent data, codebooks, etc. The processing circuit 356 may also be implemented with either hardware or software. The function of each element of a UE 350 is similar to a BS 300 and therefore detailed descriptions for each element will not be repeated.

Figure 4:
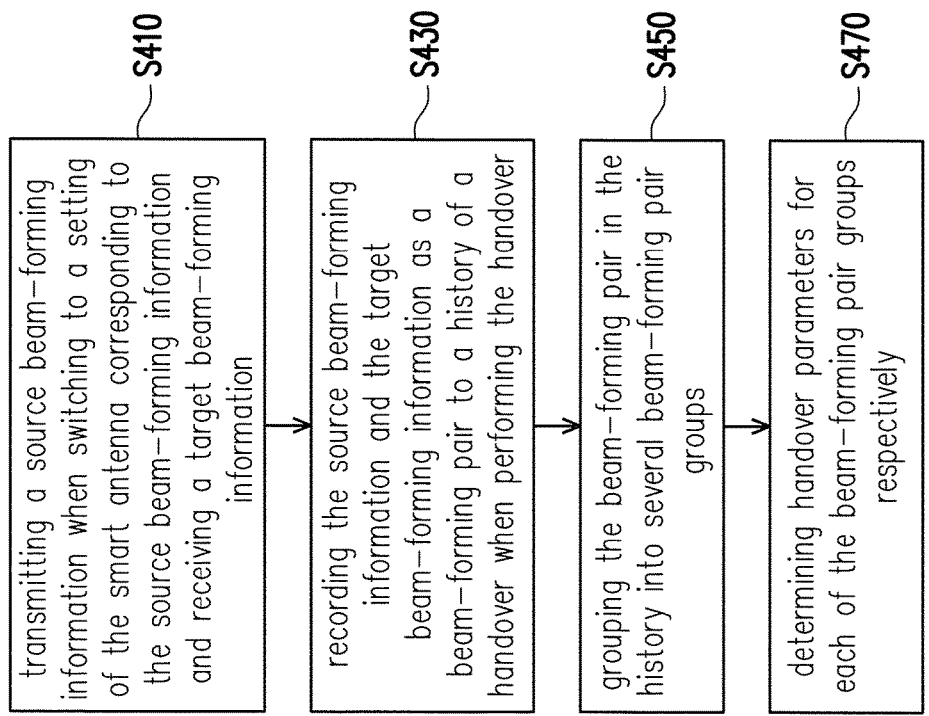
FIG. 4 is a flow chart illustrating a handover management method according to an exemplary embodiment of the disclosure.

FIG. 4 is a flow chart illustrating a handover management method according to an embodiment of the disclosure. In step S410, the interface controller module 313 of the processing module 306 transmits a source beam-forming information when switching to a setting of the smart antenna corresponding to the source beam-forming information and receiving a target beam-forming information by using the interface controller 307. In one embodiment of the disclosure, the interface controller module 313 transmits a source beam pattern information of the source beam-forming information by using the interface controller 307 when switching to a source beam pattern corresponding to the source beam pattern information, and receives a target beam pattern information of the target beam-forming information using the interface controller 307. Furthermore, the interface controller module 313 transmits the source beam-forming information and receives the target beam-forming information using the interface controller 307 via a wired or a wireless communication interface such as X2 interface.

Figure 2:
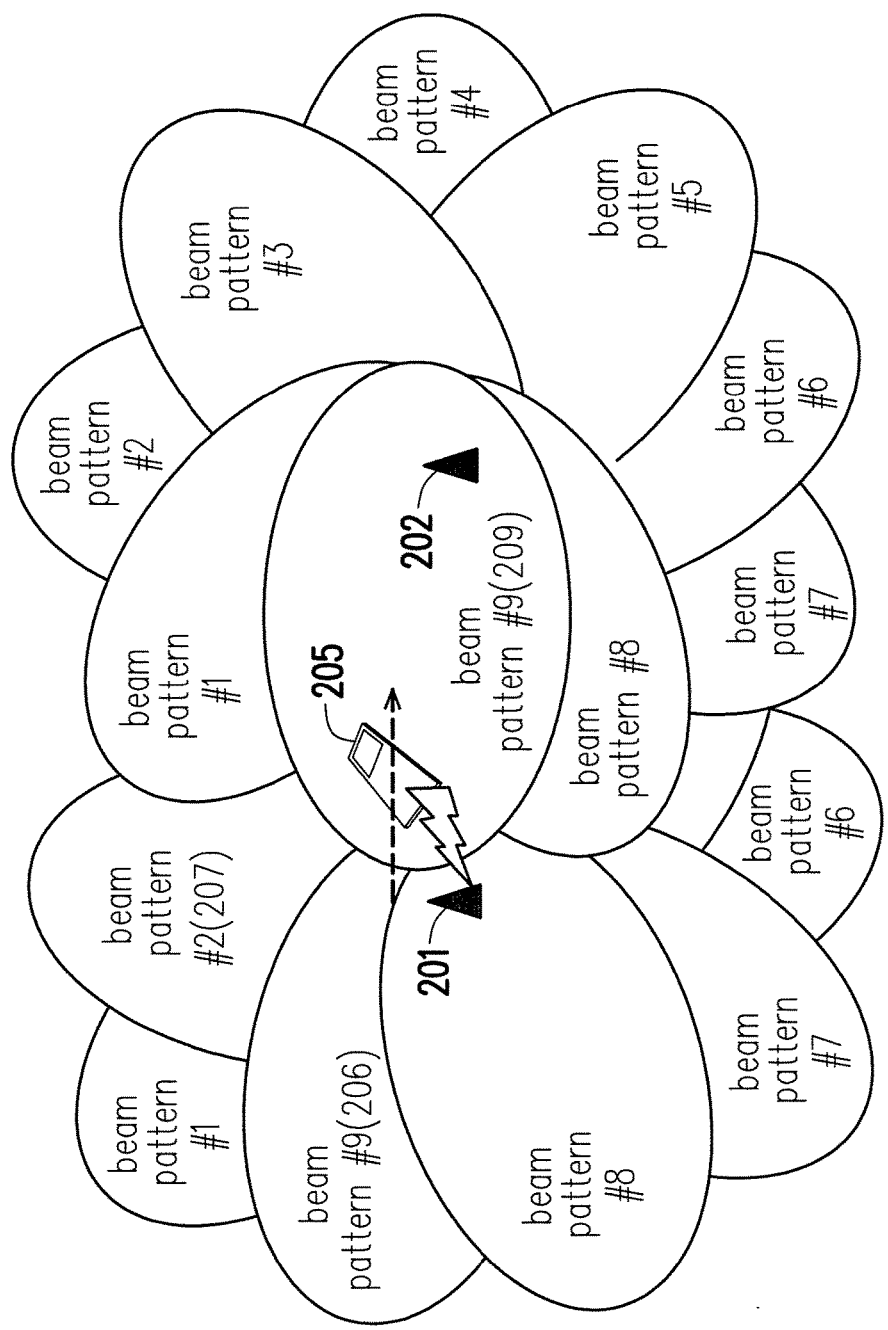
FIG. 2 is an example illustrating coverage area of two smart antennas with different beam patterns.

Specifically, when the BS 300 decides to switch to the source beam pattern such as the beam pattern #2(207) of BS 201 in FIG. 2, and the source beam pattern information is configured for the transceiver circuit 303 and smart antenna circuits 302, the mobility management module 311 receives the source beam pattern information from the transceiver circuit 303, then the mobility management module 311 writes the source beam pattern information into interface communication message such as X2 message, and the interface controller module 313 transmits the interface communication message to the neighboring BSs via for example but not limited to the X2 interface using the interface controller 307. In addition, the interface controller module 313 may receive another interface communication message from neighboring BSs via for example but not limited to the X2 interface using the interface controller 307.

Figure 5:
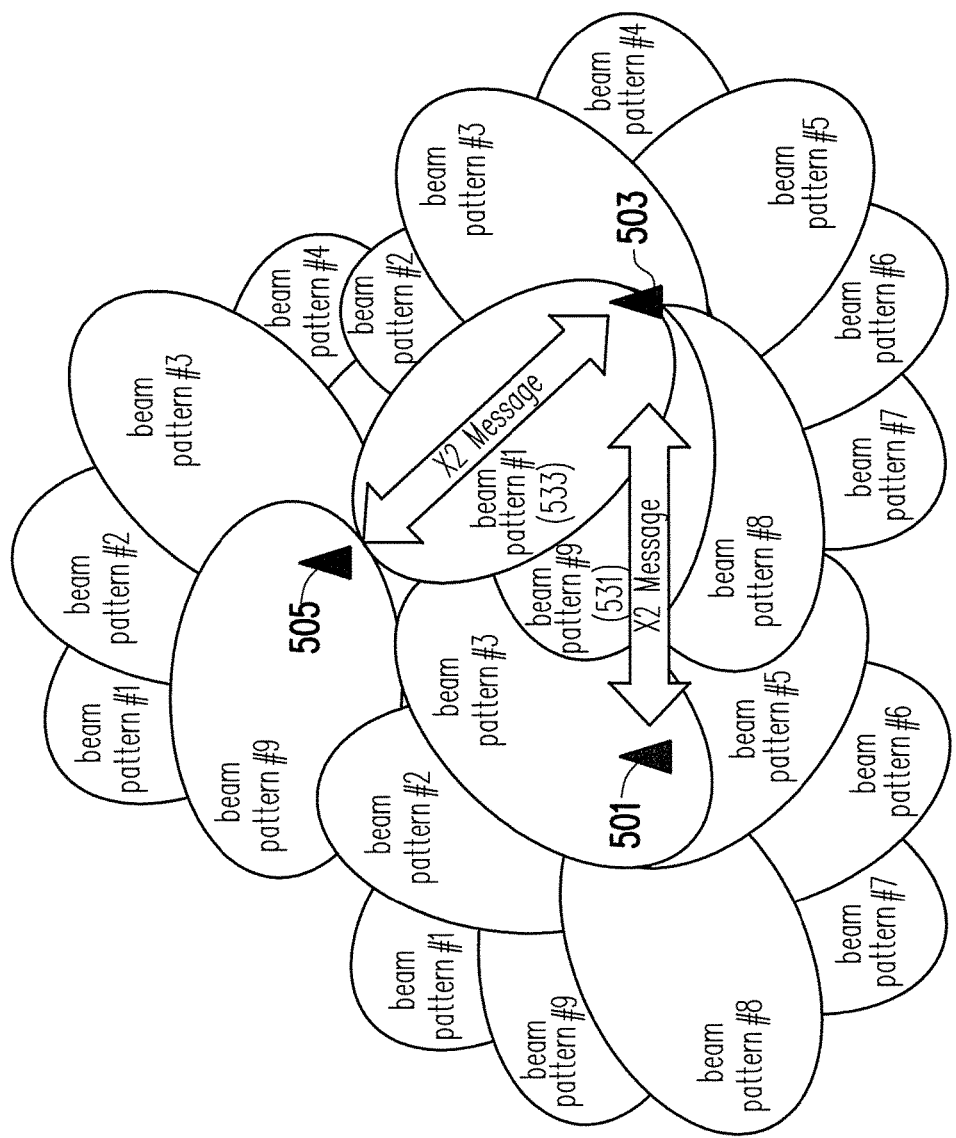
FIG. 5 is an example illustrating exchanging beam pattern information according to an exemplary embodiment of the disclosure.

For example, FIG. 5 is an example illustrating exchanging beam pattern information according to the embodiment of the disclosure. Table (1), table (2), and table (3) are beam pattern lists of BSs 501, 503, and 505, respectively. Assuming that BS 503 switches to beam pattern #1(533) from beam pattern #9(531). Afterwards, the BS 503 would transmit X2 messages that include beam pattern information such as beam pattern #1(533) from beam pattern #9(531)) to the BSs 501 and 505. Subsequently, the BSs 501 and 505 update their beam pattern lists as showed in table (1) and table (3).

TABLE (1)

Beam pattern list of BS 501

| BS 501 (local) | Beam pattern #3 |
|---|---|
| BS 503 | Beam pattern #9(531) → |
|  | Beam pattern #1(533) |
| BS 505 | Beam pattern #9 |

TABLE (2)

Beam pattern list of BS 503

| BS 503 (local) | Beam pattern #9(531) → |
|---|---|
|  | Beam pattern #1(533) |
| BS 501 | Beam pattern #3 |
| BS 505 | Beam pattern #9 |

TABLE (3)

Beam pattern list of BS 505

| BS 505 (local) | Beam pattern #9 |
|---|---|
| BS 501 | Beam pattern #3 |
| BS 503 | Beam pattern #9(531) → |
|  | Beam pattern #1(533) |

Next, in step S430, the mobility management module 311 records the source beam-forming information and the target beam-forming information as a beam-forming pair to a history of a handover when performing the handover. Referring to FIG. 3, assuming a UE (not shown) is moving into coverage area of BS 503 from coverage area of BS 501, and the UE reports a message that a received signal strength such as reference signal received power (RSRP) from the BS 503 is larger than the BS 501 (e.g., exceed A3 event threshold) to the BS 501. The BS 501 begins to perform the handover procedure by the radio control module 315.

After the UE handovers to the BS 503, in one embodiment of the disclosure, the mobility management module 311 of BS 501 records the handover results of the beam-forming pairs to the history of the handover when performing the handover. Specifically, the BS 501 records the source beam-forming information and the target beam-forming information as a beam-forming pair such as beam pattern #3 of the BS 501 and beam pattern #1 of the BS 503 according to the table (1). Then, the mobility management module 311 of the BS 501 records the handover result such as too-late, too-early, or success that was received from the BS 503 or the UE with the beam-forming pair to the history of the handover.

Table (4) is an example of the history of the handover. A serving cell such as BS 501 would record cell numbers of the serving cell and the target cells such as BSs 503 and 505 from which the UEs handover to, with the handover (HO) results in order of the timestamp.

TABLE (4)

| Timestamp | Serving Cell | Target Cell | Serving Cell beam pattern | Target Cell beam pattern | Ho result |
|---|---|---|---|---|---|
| 1395915093 | Cell1 | Cell2 | #1 | #1 | Too-early |
| 1397453037 | Cell1 | Cell3 | #1 | #3 | Success |
| ... | ... | ... | ... | ... | ... |
| 1397488888 | Cell1 | Cell2 | #3 | #3 | Too-late |

Next, in step S450, the mobility management module 311 groups the beam-forming pair in the history into several beam-forming pair groups. In one embodiment of the disclosure, the mobility management module 311 determines the beam-forming pair groups from the beam-forming pairs in the history according to handover results of the beam-forming pairs.

Specifically, assuming that the beam-forming pair groups are arranged into a binary tree structure. When a handover of a beam-forming pair such as beam pattern #3 of the BS 501 and beam pattern #1 of the BS 503 has occurred for the first time, the mobility management module 311 would add the beam-forming pair into a root group of the beam-forming pair groups.

Next, the mobility management module 311 calculates first abnormal handover inclinations (AHIs) of the beam-forming pairs according to the handover results of the beam-forming pairs when counts of the handover results of the beam-forming pairs are larger than a handover count threshold. The first abnormal handover inclination of the beam-forming pairs would be based on count differences between too-late handover and too-early handover of the handover results of the beam-forming pairs, and compares the first abnormal handover inclinations of the beam-forming pairs with a high inclination threshold and a low inclination threshold to group the beam-forming pairs into the beam-forming pair groups. In addition, the high inclination threshold is large than the low inclination threshold.

Specifically, the mobility management module 311 may scan and analyze the history of the handover at predetermined interval (e.g., 1 minute, 20 minutes, or an hour). When a count of the handover results of one of the beam-forming pair groups is larger than a handover count threshold (e.g., 10, 50, or 500), the mobility management module 311 may calculates a first AHI of the beam-forming pair whose count of the handover result are exceed the handover count threshold. In one embodiment of the disclosure, the first AHI of the beam-forming pair can be calculated as following equation (1):

$$AHI = (\text{beamforming pair individual too late } HO \text{ count} - \text{beamforming pair individual too early } HO \text{ count})/\text{beamforming pair individual } RLF \text{ count} \times 100(\%) \quad (1)$$

The beam-forming pair individual too-late handover count is a count that too-late handover is occurred on the beam-forming pair, the beam-forming pair individual too-early handover count is a count that too-early handover is occurred on the beam-forming pair, and the beam-forming pair individual RLF count is a count of the RLF reports of the beam-forming pair recorded in the history of the handover. For example, if AHI is equal to ten, that means the handover inclination of the beam-forming pair is inclined that too-late handover has more 10% than too-early handover.

Next, the mobility management module 311 may determines whether the first abnormal handover inclinations of the beam-forming pairs are larger than the high inclination threshold or the abnormal handover inclinations of the beam-forming pairs are smaller than the low inclination threshold to group the beam-forming pairs into the beam-forming pair groups. If the AHI of the beam-forming pair is larger than the high inclination threshold, then the mobility management module 311 may move the beam-forming pair to a right sub-node group at right side of the root group in the beam-forming pair groups. If the right sub-node group is not existed, then the mobility management module 311 may establish the right sub-node group. On the other hand, if the AHI of the beam-forming pair is smaller than the low inclination threshold, then the mobility management module 311 may move the beam-forming pair to a left sub-node group at left side of the root group in the beam-forming pair groups. If the right sub-node group is not existed, then the mobility management module 311 may establish the right sub-node group. Furthermore, if the AHI of the beam-forming pair is not smaller than the high inclination threshold but is also larger than the low inclination threshold, then the mobility management module 311 may keep the beam-forming pair in current group (e.g., the root group).

For example, assuming the high inclination threshold is 25 and the low inclination threshold is −25. If AHI of a beam-forming pair is 30, the beam-forming pair may be moved to the right sub-node group. If the AHI of another beam-forming pair is −30, the beam-forming pair may be moved to the left sub-node group. In addition, if the AHI of a beam-forming pair is 10 or null (e.g., count of handover result is not enough), the beam-forming pair may stay in the root group.

Table (5) is an example of group information of beam-forming pair groups. Each of the beam-forming pair groups may comprise one or more beam-forming pairs. In the table (5), the beam-forming pair for example the beam pattern #1 of the serving cell (Cell1) and the beam pattern #1 of the target cell (Cell2) is denoted as #1-Cell2-#1, and so forth.

TABLE (5)

| Beam-forming pairs group | Beam-forming pairs |
|---|---|
| #1 | #1-Cell2-#1 |
|  | #1-Cell2-#2 |
|  | #1-Cell2-#3 |
| #2 | #1-Cell2-#8 |
|  | #1-Cell2-#9 |
| ... | ... |
| #N | #2-Cell2-#1 |
|  | #2-Cell3-#2 |

Subsequently, in step 470, the mobility management module 311 may determine handover parameters for each of the beam-forming pair groups respectively. In one embodiment of the disclosure, the mobility management module 311 accumulates abnormal handover results of the beam-forming pairs for each of the beam-forming pair groups, and the mobility management module 311 determines handover parameters for each of the beam-forming pair groups according to the accumulated abnormal handover results of the beam-forming pairs for each of the beam-forming pair groups.

For example, the mobility management module 311 scans the history of the handover to produce an analysis result. Next, the mobility management module 311 accumulates counts of too-early handover, too-late handover, and total handover for each of the beam-forming pair groups (e.g., the root group, the right sub-node group, and the left sub-node group), respectively. For example, Table (6) is an example of analyzed result.

TABLE (6)

| Beam-forming pairs group | Total HO | Too-late HO | Too-early HO | ... |
|---|---|---|---|---|
| #1 | 130 | 36 | 1 | ... |
| #2 | 85 | 0 | 22 | ... |
| ... | ... | ... | ... | ... |
| #N | 2 | 10 | 0 | ... |

Next, the mobility management module 311 provides handover parameters (e.g., Time to Trigger (TTT), A3 event threshold, Cell Individual Offset (CIO), etc.) for each of the beam-forming pair groups according to the analyzed results. For example, Table (7) is an example of handover parameters of each of the beam-forming pair groups. Afterwards, the mobility management module 311 may transmit the handover parameters to the UE using the transceiver circuit 303.

TABLE (7)

| Beam-forming pairs group | TTT | A3 event threshold | CIO | ... |
|---|---|---|---|---|
| #1 | +32 | +0 | 0 | ... |
| #2 | −16 | −5 | 0 | ... |
| ... | ... | ... | ... | ... |
| #N | 0 | 0 | 0 | ... |

Figure 6A:
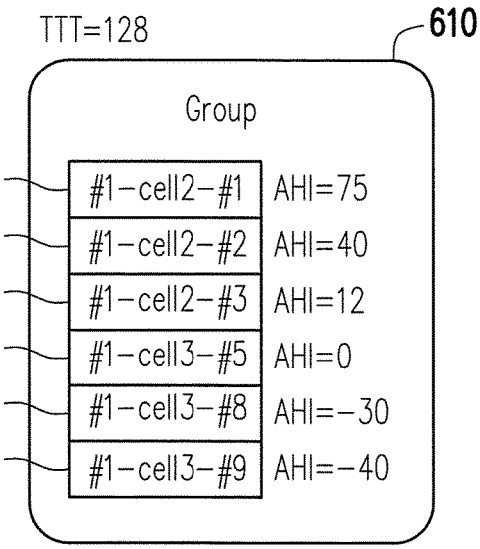
FIG. 6A~6C are examples illustrating grouping and handover parameter assignment procedure according to an exemplary embodiment of the disclosure.
Figure 6B:
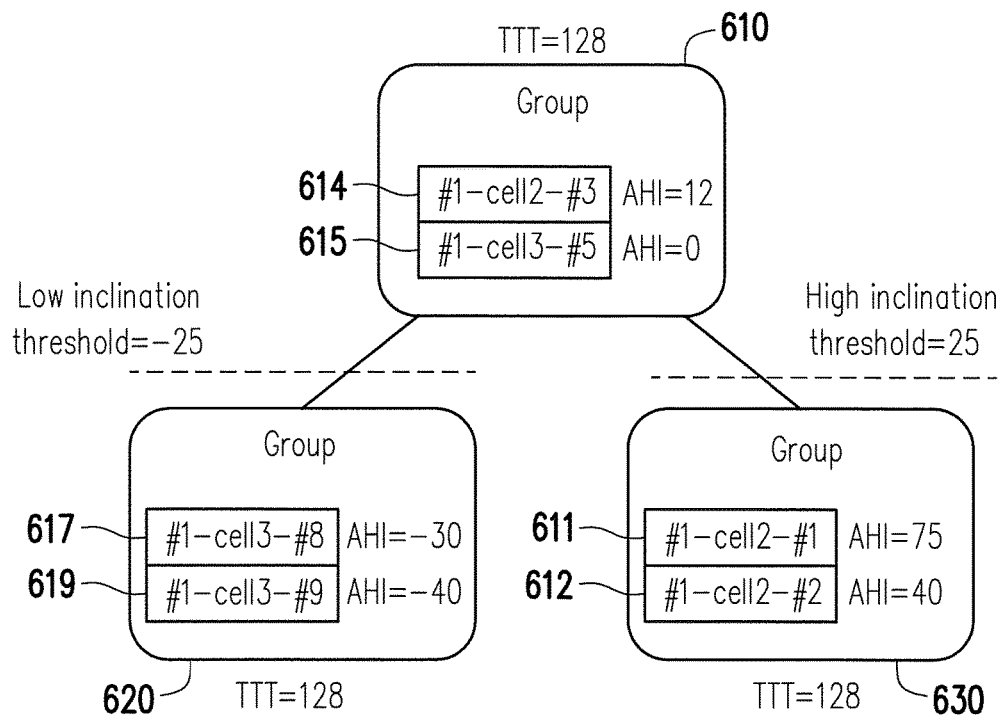
Figure 6C:
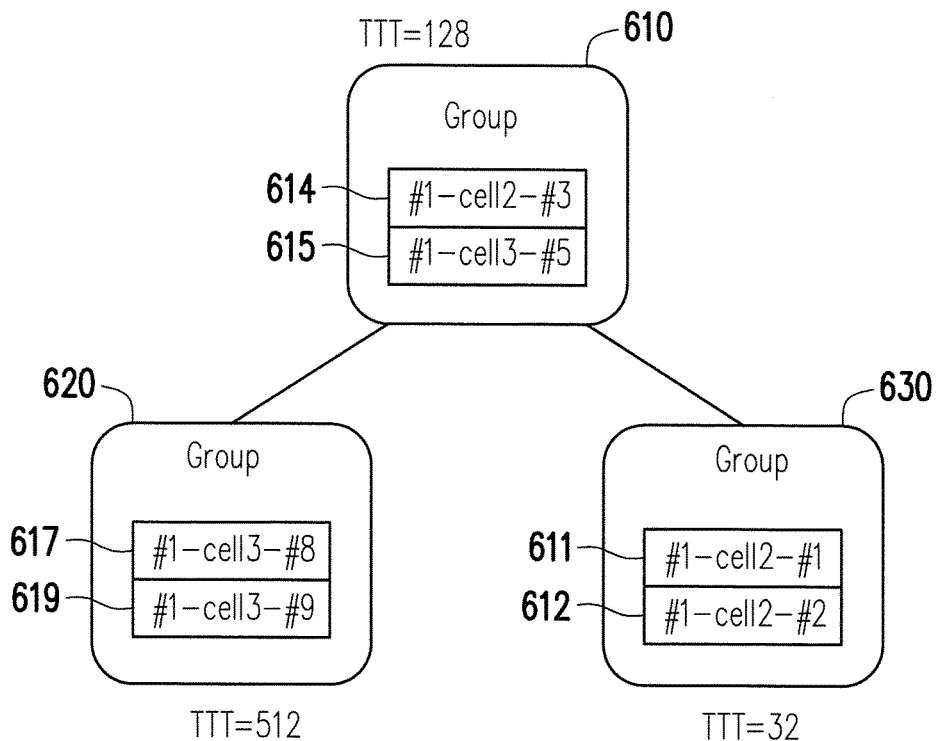

FIG. 6A~6C are examples illustrating grouping and handover parameter assignment procedure according to an exemplary embodiment of the disclosure. Referring to FIG. 6A, assuming that TTT value is configured to 128 for beam-forming pairs 611, 612, 614, 615, 617, and 619 in group 610, AHIs of each of the beam-forming pairs 611, 612, 614, 615, 617, and 619 are presented at the right side of each of the beam-forming pairs 611, 612, 614, 615, 617, and 619. Referring to FIG. 6B, it is assumed that the high inclination threshold is 25 and the low high inclination threshold is −25. Therefore, the beam-forming pairs 614 and 615 stay in group 610, the beam-forming pairs 617 and 619 are moved into group 620, and the beam-forming pairs 611 and 612 are moved into group 630. Next, referring to FIG. 6C, TTT value of group 610 is not changed, TTT value of group 620 is configured to 512, and TTT value of group 630 is configured to 32.

Accordingly, the UE may perform handover with suitable handover parameters, so as to reduce the count of abnormal handover. However, the aforementioned embodiment only describes that the beam-forming pairs are classified into at least three beam-forming pair groups. Therefore, the following embodiments will describe progressive modifications of MRO for these beam-forming pairs.

In one embodiment of the disclosure, the mobility management module 311 calculates second AHIs of the beam-forming pairs according to the handover results of the beam-forming pairs after performing the handover based on the handover parameters. Specifically, after performing the handover using the updated handover parameters, the handover results of the beam-forming pairs may thus be changed. Therefore, the mobility management module 311 may remove the handover results of the beam-forming pairs in the history of the handover after updating the handover parameters of the beam-forming pairs. Next, the mobility management module 311 may continuously scan and analyze the history of the handover at predetermined interval (e.g., 1 minute, 20 minutes, or an hour), and after the count of the newly recorded handover results of a beam-forming pair in the history of the handover is larger than the handover count threshold, the mobility management module 311 calculates the second AHI based on the newly recorded handover results of the beam-forming pair. In this embodiment, the calculation of the second AHI is similar to the first AHI and therefore detailed descriptions for each element will not be repeated.

Afterwards, the mobility management module 311 compares the second AHIs of the beam-forming pairs with the high inclination threshold and the low inclination threshold to determine whether to move the beam-forming pairs into another group of the plurality of beam-forming pair groups. If the AHI of the beam-forming pair is larger than the high inclination threshold, then the mobility management module 311 may move the beam-forming pair to another right sub-node group at right side of the current group of the beam-forming pair in the beam-forming pair groups. On the other hand, if the AHI of the beam-forming pair is smaller than the low inclination threshold, then the mobility management module 311 may move the beam-forming pair to another left sub-node group at left side of the current group of the beam-forming pair in the beam-forming pair groups. Furthermore, if the AHI of the beam-forming pair is not only smaller than the high inclination threshold but also larger than the low inclination threshold, then the mobility management module 311 may keep the beam-forming pair in the current group the beam-forming pair.

Subsequently, the mobility management module 311 re-determines handover parameters for each of the plurality of beam-forming pair groups respectively. In one embodiment of the disclosure, when a beam-forming pair group (i.e., a sub-node group) is established, the handover parameters of the newly established beam-forming pair group may be followed the original beam-forming pair group (i.e., previous beam-forming pair group) at first. Then, the mobility management module 311 re-determines handover parameters for newly established beam-forming pair group according to the AHI of the newly established beam-forming pair group. For example, a left sub-node group at left side of an original beam-forming pair group may be assigned a TTT value which is lager than the original beam-forming pair group's TTT value, and a right sub-node group at right side of an original beam-forming pair group may be assigned a TTT value which is less than the original beam-forming pair group's TTT value. Furthermore, if two beam-forming pair groups have the same handover parameters, then these beam-forming pair groups may be merged to one beam-forming pair group.

It should be noted that, the aforementioned steps of determining the handover parameters for each of the beam-forming pair groups and grouping the beam-forming pair in the history into the beam-forming pair groups may be performed independently and respectively, and the two steps may not be performed at the same time. Furthermore, since performing the handover using the updated handover parameters, the mobility management module 311 may update the handover results, group the beam-forming pairs into the beam-forming pair groups, and re-determines the handover parameters for each of the beam-forming pair groups again, and so forth.

Figure 7A:
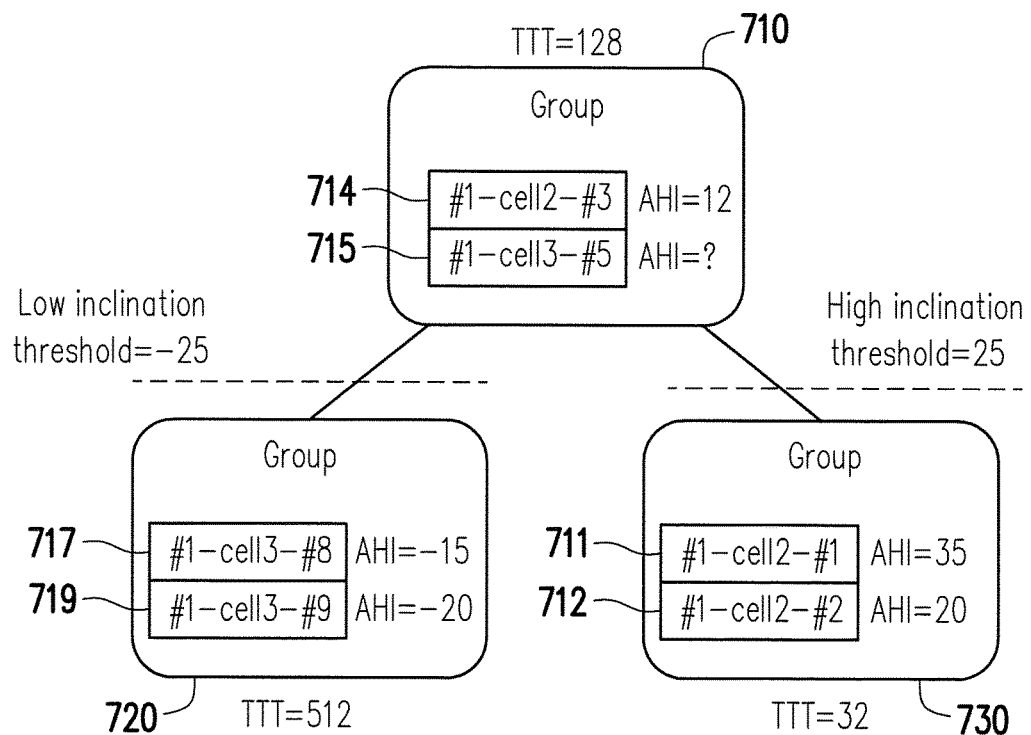
FIG. 7A~7B are examples illustrating grouping and handover parameter assignment procedure according to an exemplary embodiment of the disclosure.
Figure 7B:
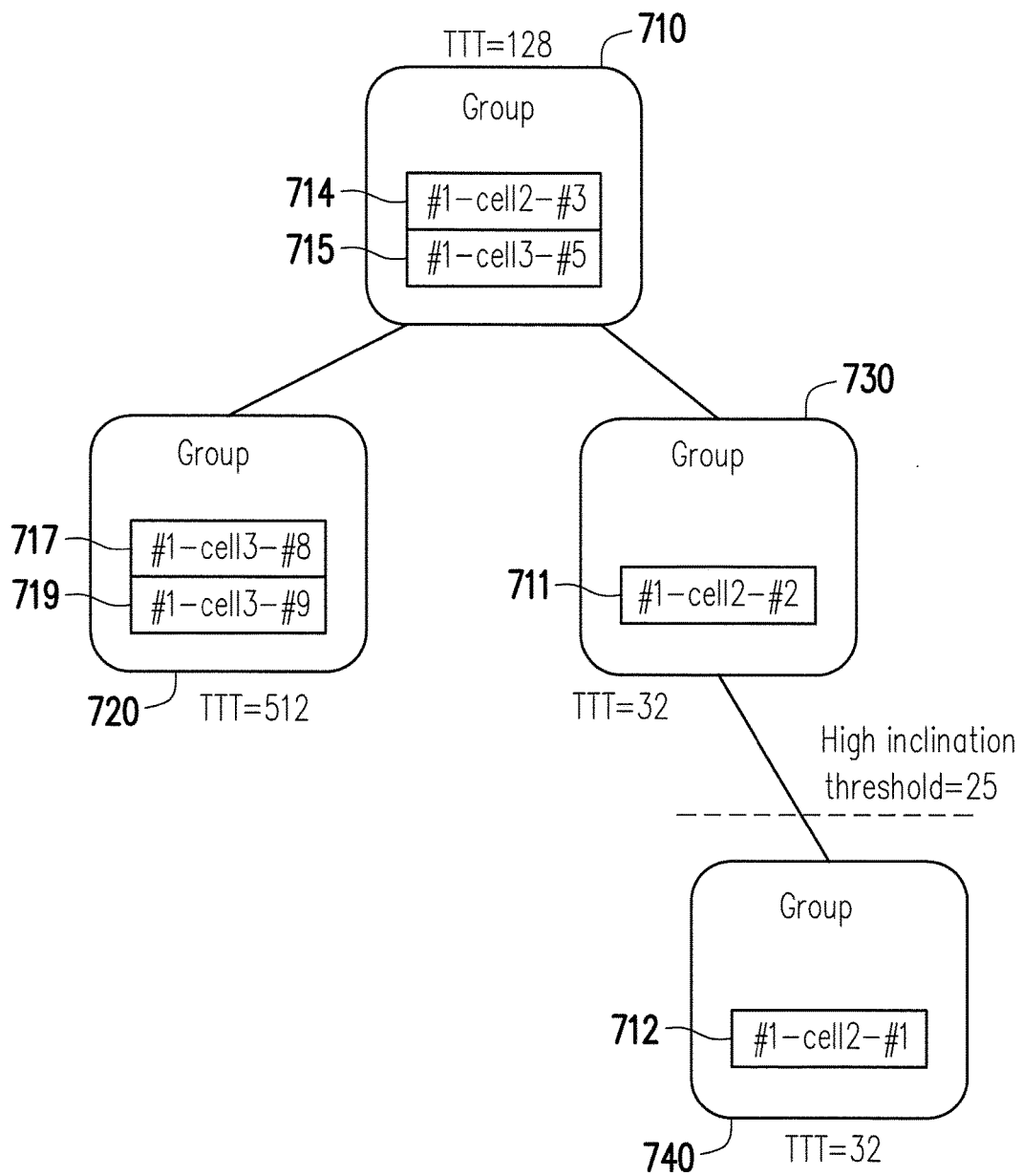

FIG. 7A~7B are examples illustrating grouping and handover parameter assignment procedure according to the embodiment of the disclosure. Referring to FIG. 7A, TTT value of group 710 is configured to 128, TTT value of group 720 is configured to 512, and TTT value of group 730 is configured to 32. The AHIs of each of the beam-forming pairs 711, 712, 714, 715, 717, and 719 are presented at the right side of each of the beam-forming pairs 711, 712, 714, 715, 717, and 719. Referring to FIG. 7B, it is assumed that the high inclination threshold is equal to 25 and the low inclination threshold is equal to −25. Therefore, after the re-grouping, the beam-forming pair 712 is moved into group 740 because AHI of the beam-forming pair 712 is larger than the high inclination threshold, and TTT value of the group 740 is configured to 32. The beam-forming pairs 711, 714, 715, 717, and 719 are still in their current beam-forming pair group because the AHIs of the beam-forming pairs 711, 714, 715, 717, and 719 are between the high inclination threshold and the low inclination threshold. It should be noted that, the TTT value of the group 740 may be configured to 16 after re-determining the handover parameters.

In addition, in one embodiment of the disclosure, if all beam-forming pairs in an original beam-forming pair group are moved into its sub-node group, the mobility management module 311 adjusts the relation of all nodes of the beam-forming pair groups, and keeps the integrity of the structure of binary tree. Furthermore, if the sub-node group (right or left sub-node group) exists, then the sub-node group may replace the original beam-forming pair group.

Figure 8A:
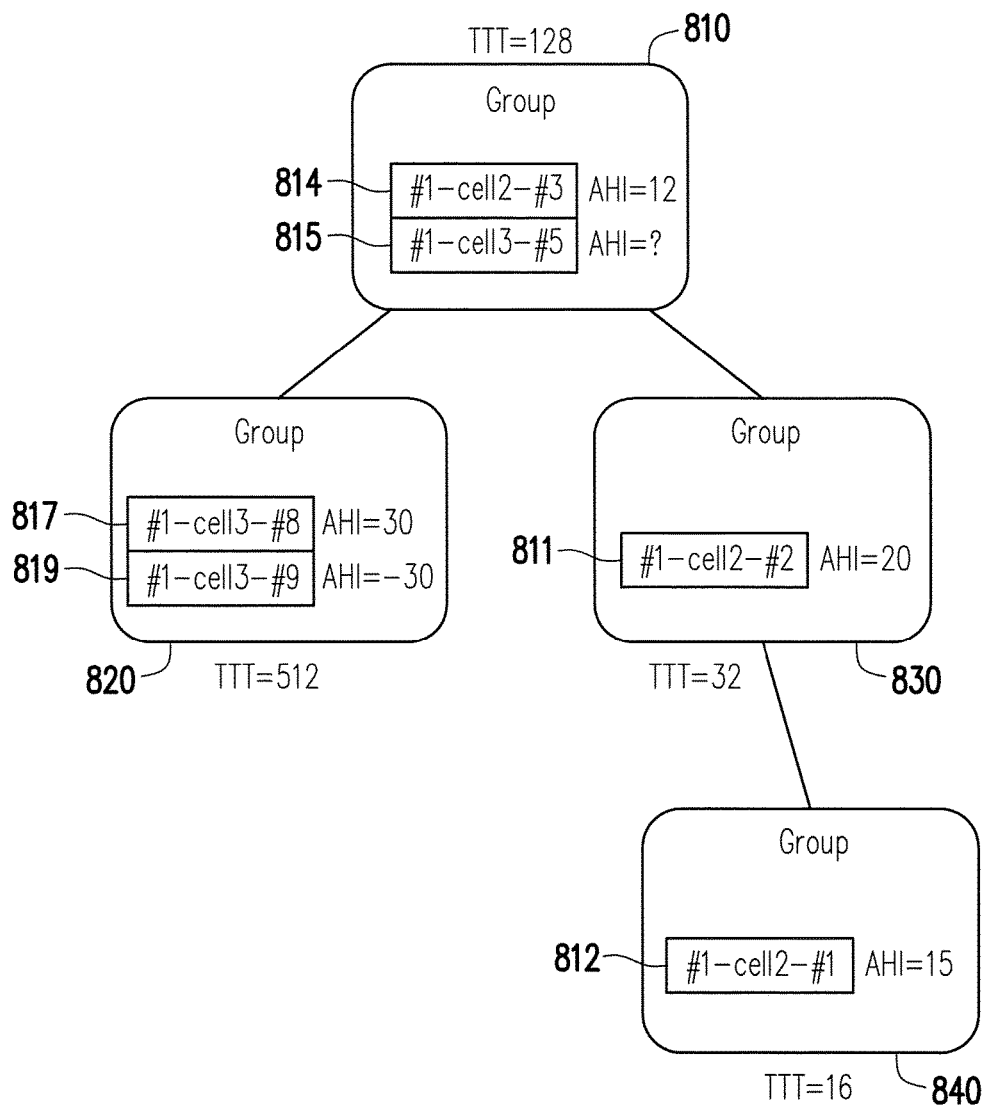
FIG. 8A~8D are examples illustrating grouping and handover parameter assignment procedure according to an exemplary embodiment of the disclosure.
Figure 8B:
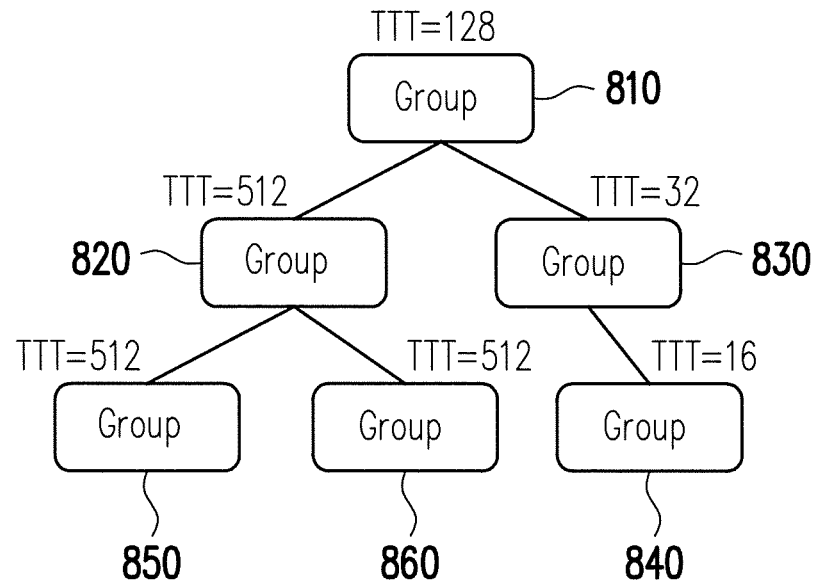

For example, FIG. 8A~8D are examples illustrating grouping and handover parameter assignment procedure according to the embodiment of the disclosure. Referring to FIG. 8A, TTT value of group 810 is configured to 128, TTT value of group 820 is configured to 512, TTT value of group 830 is configured to 32, and TTT value of group 840 is configured to 16. The AHIs of each of the beam-forming pairs 811, 812, 814, 815, 817, and 819 are presented at the right side of each of the beam-forming pairs 811, 812, 814, 815, 817, and 819. Referring to FIG. 8B, it is assumed that the high inclination threshold is equal to 25 and the low inclination threshold is equal to −25. Therefore, the beam-forming pair 819 may be moved into group 850, and the beam-forming pair 817 may be moved into group 860. TTT values of groups 850 and 860 are configured to 512 after re-determining TTT values of groups 850 and 860 according to the AHIs of groups 850 and 860.

Figure 8C:
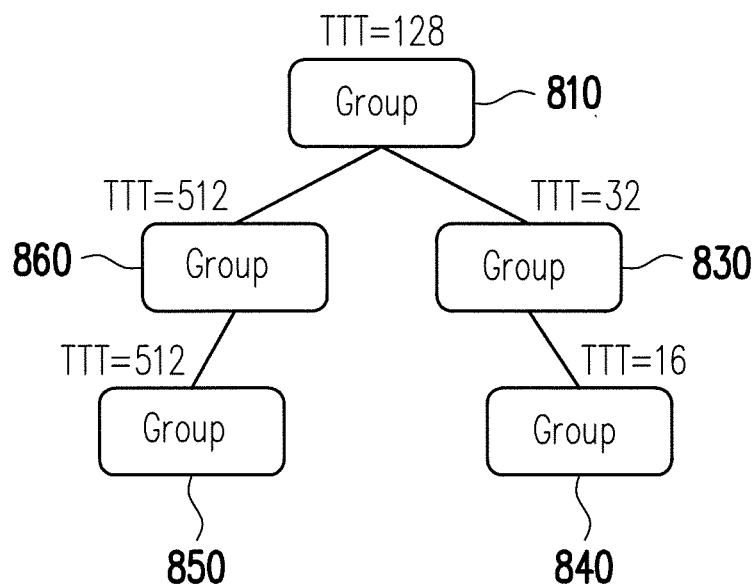
Figure 8D:
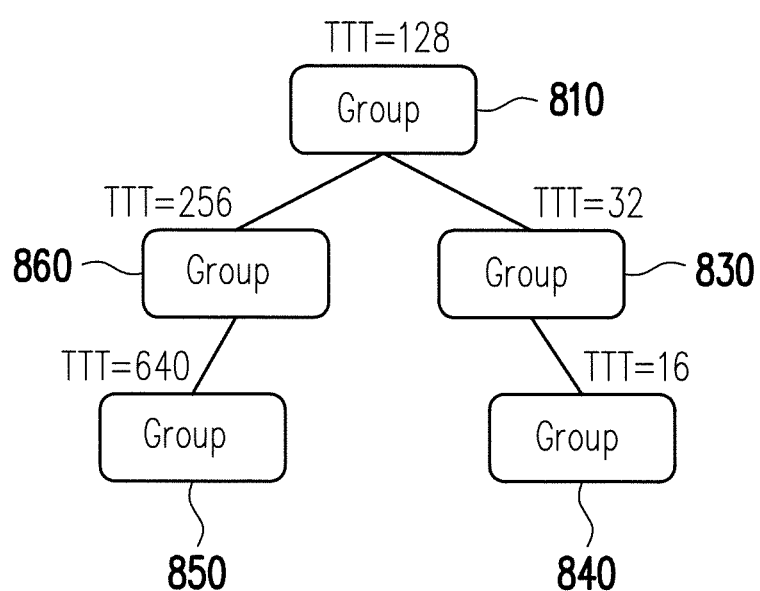

Referring to FIG. 8C, because all beam-forming pairs (i.e., the beam-forming pairs 817 and 819) are moved into other beam-forming pair groups (i.e., groups 850 and 860), the group 860 may be adjusted to replace group 620. Subsequently, referring to FIG. 8D, TTT values of groups 850 and 860 are configured to 640 and 256 respectively after optimizing the handover parameters according to the handover results of groups 850 and 860.

In view of the aforementioned descriptions, the present disclosure proposes a handover management and a base station using the same to resolve the traditional MRO mechanism with smart antenna. The handover management comprises transmitting beam pattern information when switching to the beam pattern information via a connection between two BSs, recording beam-forming pairs with their handover results when performing handover, grouping beam-forming pairs into beam-forming pair groups according to the handover results, and determining handover parameters for each of the beam-forming pair groups. Accordingly, the proposed handover management and the base station with smart antenna using the same may reduce the count of abnormal handover.

It should be noted that the adjectives "first" or "second" are simply used to distinguish one item or object from another and thus may or may not imply a sequence of events.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of," "any combination of," "any multiple of," and/or "any combination of multiples of the items," and/or "the categories of items," individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A handover management method used by a base station with a smart antenna, and the handover management method comprises:
    transmitting a source beam-forming information of a source beam pattern utilized by the base station in response to switching to a setting of the smart antenna through utilizing the source beam-forming information and receiving a target beam-forming information of a target beam pattern utilized by another base station;
    in response to performing a handover, recording a beam-forming pair to a history of the handover by associating the source beam pattern of the base station with the target beam pattern of the another base station;
    after performing the handover, grouping the beam-forming pair in the history into a plurality of beam-forming pair groups according to handover results of different beam-forming pair; and
    determining handover parameters for each of the plurality of beam-forming pair groups respectively.

2. The handover management method of claim 1, wherein grouping the beam-forming pair in the history into the plurality of beam-forming pair groups according to the handover results of different beam-forming pair comprising:
    calculating first abnormal handover inclinations of the beam-forming pairs according to the handover results of the beam-forming pairs when counts of the handover results of the plurality of beam-forming pairs are larger than a handover count threshold, wherein the first abnormal handover inclinations of the beam-forming pairs are based on count differences between too-late handover and too-early handover of the handover results of the beam-forming pairs; and
    comparing the first abnormal handover inclinations of the beam-forming pairs with a high inclination threshold and a low inclination threshold to group the beam-forming pairs into the plurality of beam-forming pair groups, wherein the high inclination threshold is large than the low inclination threshold.

3. The handover management method of claim 2, wherein comparing the first abnormal handover inclinations of the beam-forming pairs with the high inclination threshold and the low inclination threshold to group the beam-forming pairs into the plurality of beam-fonning pair groups comprising:

determining whether the first abnormal handover inclinations of the beam-forming pairs are larger than the high inclination threshold or the abnormal handover inclinations of the beam-forming pairs are smaller than the low inclination threshold to group the beam-forming pairs into the plurality of beam-forming pair groups.

4. The handover management method of claim 2, wherein after the step of determining handover parameters for each of the plurality of beam-forming pair groups respectively, the handover management method further comprises:

calculating second abnormal handover inclinations of the beam-forming pairs according to the handover results of the beam-forming pairs after performing the handover based on the handover parameters; and comparing the second abnormal handover inclinations of the beam-forming pairs with the high inclination threshold and the low inclination threshold to determine whether to move the beam-forming pairs into another group of the plurality of beam-forming pair groups.

5. The handover management method of claim 4, wherein after the step of comparing the second abnormal handover inclinations of the beam-forming pairs with the high inclination threshold and the low inclination threshold to group the beam-forming pairs into the plurality of beam-fon iing pair groups to group the beam-forming pairs into another group of the plurality of beam-forming pair groups, the handover management method further comprises:

re-determining handover parameters for each of the plurality of beam-forming pair groups respectively.

6. The handover management method of claim 1, wherein recording the source beam-forming information and the target beam-forming information as the beam-forming pair to the history of a handover in response to performing the handover comprising:

recording the handover results of the beam-forming pairs to the history of the handover in response to performing the handover.

7. The handover management method of claim 1, wherein the step of determining handover parameters for each of the plurality of beam-forming pair groups respectively comprises:

accumulating abnormal handover results of the beam-forming pairs for each of the plurality of beam-forming pair groups; and determining handover parameters for each of the plurality of beam-forming pair groups according to the accumulated abnormal handover results of the beam-forming pairs for each of the plurality of beam-forming pair groups.

8. The handover management method of claim 1, wherein transmitting the source beam-forming information when switching to the setting of the smart antenna corresponding to the source beam-forming information and receiving the target beam-forming information comprising:

transmitting a source beam pattern information of the source beam-forming information when switching to a source beam pattern corresponding to the source beam pattern information; and receiving a target beam pattern information of the target beam-fonning information.

9. The handover management method of claim 1, wherein transmitting the source beam-forming information when switching to the setting of the smart antenna corresponding to the source beam-forming information and receiving the target beam-forming information comprising:

transmitting the source beam-forming information and receiving the target beam-forming information via a wired or a wireless communication interface.

10. A base station, with smart antennas, and the base station comprises:

a transceiver circuit, transmitting and receiving wireless data;

an interface controller, transmitting a source beam-forming information and receiving a target beam-forming information; and a processing circuit coupled to the transceiver circuit and the interface controller and is configured for:

transmitting the source beam-forming information of a source beam pattern utilized by the base station in response to switching to a setting of the smart antenna through utilizing the source beam-forming information and receiving the target beam-forming information of a target beam pattern utilized by another base station using the interface controller;

in response to performing a handover, recording a beam-forming pair to a history of the handover by associating the source beam pattern of the base station with the target beam pattern of the another base station;

after performing the handover, grouping the beam-forming pair in the history into a plurality of beam-forming pair groups according to handover results of different beam-forming pair; and determining handover parameters for each of the plurality of beam-forming pair groups respectively.

11. The base station of claim 10, the processing circuit is further configured for:

calculating first abnormal handover inclinations of the beam-forming pairs according to the handover results of the beam-forming pairs when counts of the handover results of the plurality of beam-forming pairs are larger than a handover count threshold, wherein the first abnormal handover inclinations of the beam-forming pairs are based on count differences between too-late handover and too-early handover of the handover results of the beam-forming pairs; and comparing the first abnormal handover inclinations of the beam-forming pairs with a high inclination threshold and a low inclination threshold to group the beam-forming pairs into the plurality of beam-forming pair groups, wherein the high inclination threshold is large than the low inclination threshold.

12. The base station of claim 11, the processing circuit is further configured for:

determining whether the first abnormal handover inclinations of the beam-forming pairs are larger than the high inclination threshold or the abnormal handover inclinations of the beam-forming pairs are smaller than the low inclination threshold to group the beam-forming pairs into the plurality of beam-forming pair groups.

13. The base station of claim 11, the processing circuit is further configured for:

calculating second abnormal handover inclinations of the beam-forming pairs according to the handover results of the beam-forming pairs after performing the handover based on the handover parameters; and comparing the second abnormal handover inclinations of the beam-forming pairs with the high inclination threshold and the low inclination threshold to determine whether to move the beam-forming pairs into another group of the plurality of beam-forming pair groups.

14. The base station of claim 13, the processing circuit is further configured for:
re-determining handover parameters for each of the plurality of beam-forming pair groups respectively.

15. The base station of claim 10, the processing circuit is further configured for:
recording the handover results of the beam-forming pairs to the history of the handover-in response to performing the handover.

16. The base station of claim 10, the processing circuit is further configured for:
accumulating abnormal handover results of the beam-forming pairs for each of the plurality of beam-forming pair groups; and
determining handover parameters for each of the plurality of beam-forming pair groups according to the accumulated abnormal handover results of the beam-forming pairs for each of the plurality of beam-forming pair groups.

17. The base station of claim 10, the processing circuit is further configured for:
transmitting a source beam pattern information of the source beam-forming information using the interface controller when switching to a source beam pattern corresponding to the source beam pattern information; and
receiving a target beam pattern information of the target beam-forming information using the interface controller.

18. The base station of claim 10, the processing circuit is further configured for:
transmitting the source beam-forming information and receiving the target beam-forming information using the interface controller via a wired or a wireless communication interface.

* * * * *